United States Patent [19]
Gyugyi et al.

[11] 4,172,234
[45] Oct. 23, 1979

[54] STATIC VAR GENERATOR COMPENSATING CONTROL CIRCUIT AND METHOD FOR USING SAME

[75] Inventors: Laszlo Gyugyi, Penn Hills; Michael B. Brennen, Wilkins Township, Allegheny County; Thomas H. Putman, Penn Hills, all of Pa.

[73] Assignee: Westinghouse Electric Corp., Pittsburgh, Pa.

[21] Appl. No.: 880,270

[22] Filed: Feb. 23, 1978

[51] Int. Cl.$^2$ .............................................. H02J 3/18
[52] U.S. Cl. .................................................. 323/119
[58] Field of Search ........................ 323/101, 102, 119

[56] References Cited
U.S. PATENT DOCUMENTS 3,999,117  12/1976  Gyugyi et al. ...................... 323/119
4,000,455  12/1976  Gyugyi et al. ...................... 323/119

Primary Examiner—A. D. Pellinen
Attorney, Agent, or Firm—M. J. Moran

[57] ABSTRACT

A control circuit for a static VAR generator measures load power during consecutive half cycles of the source voltage. This information, together with load voltage and load current information is used to determine the firing angles of the VAR generator thyristors for providing compensating current for keeping the source current in phase with the source voltage and for balancing the source currents in a three-phase electrical system. The total computation time for determining the firing angles extends into the half cycle in which correction is to be applied beyond a fixed minimum firing angle.

24 Claims, 5 Drawing Figures

STATIC VAR GENERATOR COMPENSATING CONTROL CIRCUIT AND METHOD FOR USING SAME

BACKGROUND OF THE INVENTION

This invention relates generally to VAR generators and it relates in particular to high-speed circuits for ascertaining the firing angles in static VAR generators.

Static VAR generators compensate for the effects of highly-reactive loads such as arc furnaces on the terminal variables of AC supply systems. The static VAR generator or flicker compensator as it is sometimes called, includes a control circuit which measures the magnitudes of the arc furnace currents in consecutive half cycles of supply voltage. In some cases, arc furnace power may be measured rather than current. Regardless of which parameters are measured, the information is used to compute necessary compensation currents in terms of subsequently required firing angle signals for the thyristors of the static VAR generator. The VAR generator output current can only be adjusted once during each half cycle per phase. Consequently, the response time of the flicker compensator and thus its effectiveness for flicker reduction is largely dependent upon the speed with which the arc furnace current is measured and converted to a firing angle. U.S. Pat. No. 3,597,518, entitled "Electric Arc Furnace Control" by R. W. Roberts, issued Aug. 3, 1971 teaches a control system for an electric arc furnace which is designed to maintain constant arc peaks. The system is designed to respond quickly to large impedance errors, is insensitive to short-term impedance fluctuations, and at the same time is rarely highly sensitive to continuing small errors. U.S. Pat. No. 3,728,516, entitled "Welding Power Source" by A. D. Daspit, issued Apr. 17, 1973, teaches the concept of controlling SCR's in response to current and voltage applied to an electric welding device in which a capacitor is periodically semidischarged to a switching device. U.S. Pat. No. 3,936,727, issued Feb. 3, 1976 to F. W. Kelley, Jr. and G. R. E. Lezan teaches a compensation control device which determines the firing time of a static switch in accordance with a magnitude of the reactive load current and teaches a regulating means which additionally controls the firing time to maintain the line current and voltage at a selected line location substantially in phase coincidence. U.S. Pat. No. 3,999,117, issued Dec. 21, 1976 to Gyugyi et al. teaches a static VAR generator and compensator where time delayed firing angles are calculated from integrating furnace load currents over prescribed intervals during real time to thus maintain balanced load current at specified phase angles which are usually zero in a three-phase electrical system. The latter utilizes phase-to-phase voltage as a reference. In the latter system, the peak value of the phase-to-phase voltage delineates between operational cycles. Because of this, in the previous patents, it was taught to make the calculations for a control cycle prior to that cycle. The calculations were made over a period of approximately 180° and were ready for utilization in the control circuit at the beginning of the cycle as measured by the reference voltage being at its maximum value. In a later U.S. Pat. No. 4,000,455, issued Dec. 28, 1976 by Gyugyi et al, it was taught that the total computation time for determining the firing angle in each succeeding half cycle would take no longer than the length of time of the last complete half cycle immediately prior to the firing of the thyristor. In U.S. Pat. No. 4,068,159, by Gyugyi et al., it was determined that the computation time for determining the firing angle could actually extend into the half cycle in which the correction was to be applied. This could be done because of the knowledge that the amount of current necessary for compensation is such that the firing angle could not occur before a minimum firing angle of a predetermined amount which may for example be 10°. Consequently, the inventors in the previous case allowed the calculation of the actual firing angle to continue into the half cycle in which compensation was actually required by an amount equal to the previously-described minimum angular amount. It would be advantageous if apparatus and method could be discovered which extended the computation time for determining the firing angle even further into the half cycle than the previously-determined fixed minimum firing angle and thus utilized the extended firing angle time to continue to calculate information about the firing angle. As paradoxical as the latter statement seems to be, apparatus has been invented which performs that function.

SUMMARY OF THE INVENTION

In accordance with the invention, apparatus and method are taught in which the computation interval, that is the time during which the required compensation is calculated, is not fixed but follows the actual thyristor firing angle. In other words, the computation of the required compensation does not stop at the earliest possible firing point but it continues up to the actual point of firing. In this way, the required compensation is always determined from the most recent condition of the load. This results in improved frequency response for the VAR generator and consequently more effective reduction of voltage flicker caused by a rapidly varying load such as is found in an electric arc furnace. In essence, the actual firing angle is calculated at the time of the minimum firing angle. If the actual firing angle exceeds the minimum firing angle by a predetermined incremental amount, the calculation for the actual firing angle is extended by the incremental time and the actual firing angle is calculated once again at that time. This continues until the actual firing angle is determined to occur before the end of a subsequent fixed interval during which the actual firing of the thyristors is allowed to take place.

BRIEF DESCRIPTION OF THE DRAWINGS

For a better understanding of the invention, reference may be had to the preferred embodiments thereof exemplified by the accompanying drawings in which.

DESCRIPTION OF THE PREFERRED EMBODIMENTS

Figure 1:
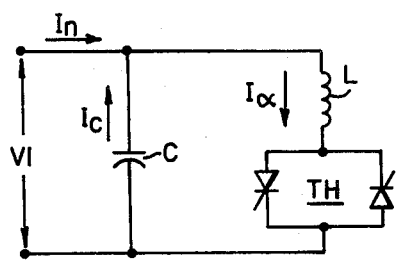
FIG. 1 shows a prior art static VAR generator power circuit.

Referring now to the drawings and prior art FIG. 1 in particular, there is shown a basic VAR generator for a single phase AC electrical system. In general, the VAR generator consists of a fixed capacitor C and a thyristor controlled inductor L. At zero leading VAR demand, the thyristor switch TH is closed and the inductive effect of the inductor L cancels the capacitive effect of the capacitor C so that the net current $I_n$ provided for the AC system is zero. That is, the algebraic sum of the capacitor current $I_c$ and the inductor current $I_\alpha$ is equal to zero. The voltage across the parallel combination which includes the capacitive element C, the inductive element L, and the thyristor switch TH is equal to V1. At some non-zero leading VAR demand, the closing of the switch TH is appropriately delayed in each half cycle of the alternating current by a variable angle which shall be called the firing angle $\alpha$ which is measured with respect to the peak of the supply voltage V1 in order to reduce the current $I_\alpha$ flowing in the inductor L.

Figure 2:
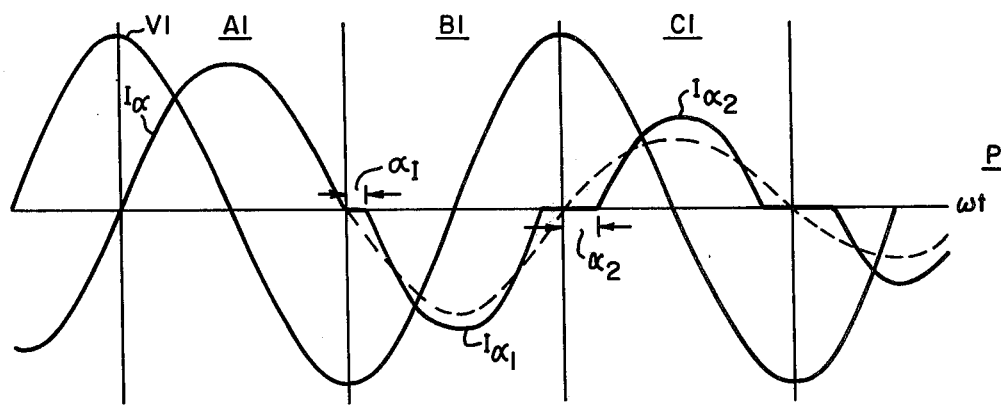
FIG. 2 shows a plot of VAR generator voltage and time-controlled inductor current versus $\omega t$ for the apparatus of FIG. 1.

Referring now to FIG. 2, there is shown a plot of voltage V1 and current $I_\alpha$ versus $\omega t$. The curves of FIG. 2 are arbitrarily divided into three zones designated A1, B1, and C1, each of which begins with the maximum positive or negative value of V1 in each half cycle as the case may be. It will be noted that in region A1, the inductor current $I_\alpha$ lags the inductor voltage V1 by 90° and the firing angle $\alpha$ is zero. However, with an increasing firing angle $\alpha$ in the region between zero and 90°, the inductive current $I_\alpha$ decreases and consequently, the leading VAR provided for the AC system increases. At the maximum leading VAR demand, the switch TH of FIG. 1 is fully opened. This occurs at $\alpha=90°$. When this happens, the current $I_\alpha$ in the inductor L in FIG. 1 is zero and therefore, the maximum rated capacitive current $I_c$ is provided for compensation. FIG. 2 shows in region B1 that for a delay or firing angle $\alpha_1$, the inductive current $I_{\alpha 1}$ flows for a shorter period of time than the current $I_\alpha$ shown in region A1. Likewise, in region C1 where the firing angle or delay is $\alpha_2$ (where $\alpha_2$ is greater than $\alpha_1$ in this case), the inductor current $I_{\alpha 2}$ flows for an even shorter period of time than those inductive currents $I_\alpha$ and $I_{\alpha 1}$ shown in regions A1 and B1, respectively.

Figure 4A:
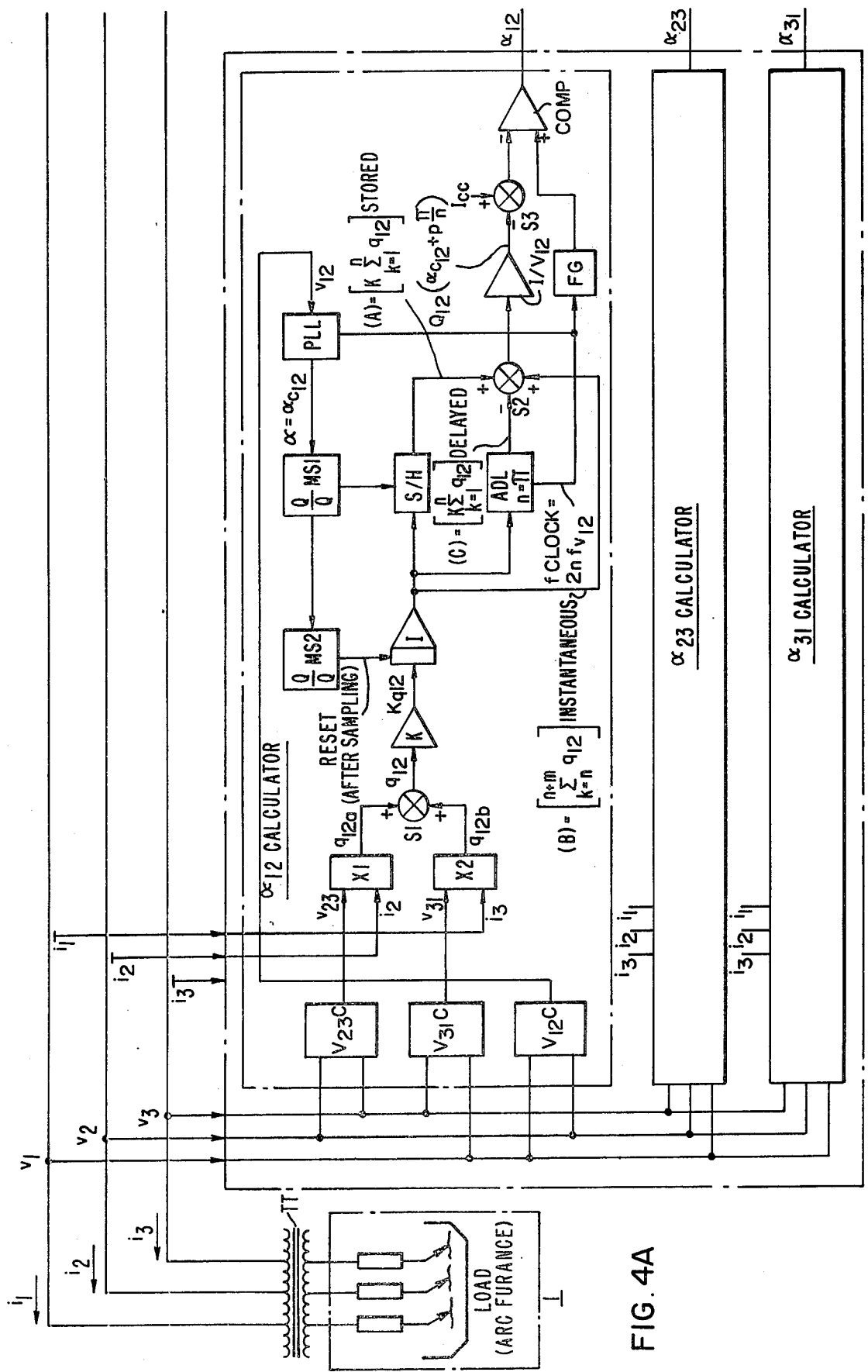
FIG. 4 (otherwise identified as FIGS. 4A and 4B) shows a compensator control circuit for an inductive load for a three-phase AC control system. A compensating control system for one phase is shown in great detail while the compensating control system for the other two phases are shown in block diagram form.
Figure 4B:
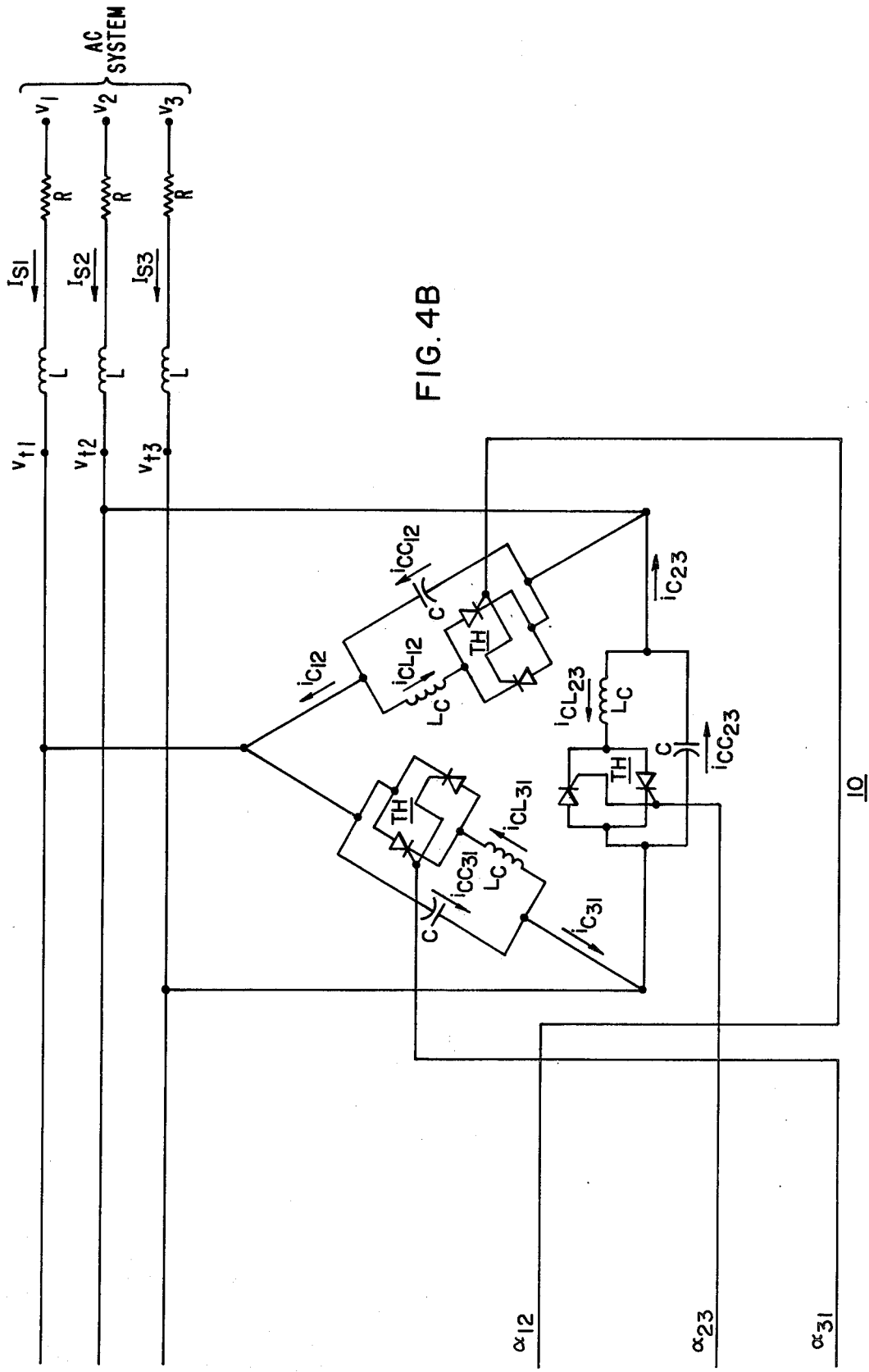

Referring now to FIG. 4, the static VAR generator 10 (or compensator) under consideration is shown schematically. The currents in the three $\Delta$ connected inductors $L_C$ of the compensator 10 are controlled by adjusting corresponding firing angles $\alpha_{12}$, $\alpha_{23}$, and $\alpha_{31}$ in every half cycle so that the combined currents of the arc furnace and the compensator are balanced and have a fixed (usually zero) reactive component. The maximum range of control of the angles $\alpha_{12}$, $\alpha_{23}$, and $\alpha_{31}$ is typically 90°, with $\alpha_{12}=0°$, $\alpha_{23}=0°$, and $\alpha_{31}=0°$, coinciding with the points where the relative line-to-line voltages $v_{12}$, $v_{23}$, and $v_{31}$, respectively, reach their peaks. The operating range of control may be reduced by introducing a fixed delay angle $\alpha_c$ and reducing the inductance of the thyristor-controlled reactor $L_c$ so that at $\alpha_c$, the maximum required inductor current is obtained. As the firing angle is retarded from the fixed delay angle $\alpha_c$, the current in the inductor $L_c$ decreases reaching zero when $\alpha_c$ plus $\alpha=90°$.

The principles of control in the prior art compensator are essentially the same regardless of the value of $\alpha_c$.

The three delay angles $\alpha_{12}$, $\alpha_{23}$, and $\alpha_{31}$, are electronically computed in two steps: first, the required currents in the thyristor controlled reactors are calculated from the currents (or power) drawn by the individual phases of the load during the half (or full) cycle interval just prior to $\alpha_c$ (note again, $\alpha_c$ is close to, and may actually be, zero), and second, the delay angles are computed using a mathematical relationship between the delay angle and the fundamental component of current in the thyristor controlled reactor. It is important to note that in the prior art control schemes the computation is usually completed at the earliest possible firing point of $\alpha=0°$, or in an improved control scheme of $\alpha=\alpha_c$. The firing angle required for the proper compensation is, of course, generally different from $\alpha=0°$ (or $\alpha=\alpha_c$). Thus, the firing angle represents an inactive interval which separates the measuring interval (information ready) from the conduction interval of the thyristor switch (information used). Load changes taking place during the inactive interval are not included in the computation of the required compensation, which fact is detrimental in achieving the shortest possible response time for the compensator.

The computation of the required compensation is based on well known expressions which establish steady state relationships between the load currents and the compensator currents or the per phase load powers and the per phase compensating VARs. The current and power equations have similar meanings and they can be converted readily into each other. The presently proposed control method can be implemented simpler and more conveniently by using basic power relationships than, for example, current relationships, and therefore the description will be restricted to the former case.

Assuming steady state sinusoidal voltages and currents, the reactive power in each phase (line-to-line) of the compensator, for balanced real line power, can be expressed in terms of two per phase load power quantities by the following expressions:

$$\left.\begin{array}{c}Q_{12} = -\frac{1}{\sqrt{3}} \frac{\int_{t_o}^{t_o + k T/2} (v_{23} i_2 + v_{31} i_1) dt}{k\frac{T}{2}} \\ Q_{23} = -\frac{1}{\sqrt{3}} \frac{\int_{t_o}^{t_o + k T/2} (v_{31} i_3 + V_{12} i_2) dt}{k\frac{T}{2}} \\ Q_{31} = -\frac{1}{\sqrt{3}} \frac{\int_{t_o}^{t_o + k T/2} (v_{12} i_1 dt + v_{23} i_3) dt}{k\frac{T}{2}}\end{array}\right\} \quad (1)$$

where $v_{12}$, $v_{23}$, $v_{31}$ are the three line-to-line voltages, $i_1$, $i_2$, $i_3$ are the three load currents, $t_o$ is an arbitrary time instant where the integration begins, T is the period time of the ac power supply, and k is any integer (k=1,2,3, ... ).

The reactive powers, $Q_{12}$, $Q_{23}$ and $Q_{31}$, required for load compensation may also be given in terms of three per-phase load power quantities as follows:

$$Q_{12} = \frac{1}{\sqrt{3}} \frac{\int_{t_o}^{t_o + k T/2} (v_{23} i_1 + v_{31} i_2 - v_{12} i_3) \, dt}{k \frac{T}{2}}$$

$$Q_{23} = \frac{1}{\sqrt{3}} \frac{\int_{t_o}^{t_o + k T/2} (v_{31} i_2 + v_{12} i_3 - v_{23} i_1) \, dt}{k \frac{T}{2}} \quad (2)$$

$$Q_{31} = \frac{1}{\sqrt{3}} \frac{\int_{t_o}^{t_o + k T/2} (v_{12} i_3 + v_{23} i_1 - v_{31} i_2) \, dt}{k \frac{T}{2}}$$

These equations express the well known relationships:

$$\begin{aligned} Q_{12} &= Q_1 + Q_2 - Q_3 \\ Q_{23} &= Q_2 + Q_3 - Q_1 \\ Q_{31} &= Q_3 + Q_1 - Q_2 \end{aligned} \quad (3)$$

where $Q_1$, $Q_2$ and $Q_3$ are the reactive load powers in phases 1, 2 and 3, respectively.

The set of Equations (1) and (2) are equivalent, expressing the same quantities in different ways.

Neither set of equations describing steady-state conditions is strictly valid under varying load conditions. However, they can still be used by making the integration over a short interval, e.g., over a half period T/2 (k=1). This means that the per phase load powers defined by Equations (1) or (2) are computed from the available supply voltages and currents in each half cycle as if they were steady-state quantities, and from these the reactive power and subsequently the corresponding firing angles required in each phase for compensation are determined. Although the integrations could be carried out over arbitrary half cycle intervals, in prior art approaches the integration intervals are rigidly tied to the ac supply voltages so that the computations are completed just prior to the possible earliest firing points (usually defined by the peaks of the corresponding supply voltages). Theoretically, there is no need for this rigid synchronization. In fact, as explained earlier, there is a considerable advantage in tying the integration interval to the actual firing point (instead of the earliest possible one).

The control principle using computation intervals that follow the corresponding firing angles is explained in conjunction with Equations (1) with the understanding that the same principle could be applied to other types of power equations, e.g., such as given in (2).

Using $\omega t$ (angle measured at $\omega$ angular frequency) as a variable, Equations (1) can be re-written for k=1 (integration over half cycle) in the following form:

$$Q_{12} = -\frac{1}{\sqrt{3}} \int_{a_{c12} - \pi}^{a_{c12}} (v_{23} i_2 + v_{31} i_1) \, d(t) \quad (A)$$

$$Q_{23} = -\frac{1}{\sqrt{3}} \int_{a_{c23} - \pi}^{a_{c23}} (v_{31} i_3 + v_{12} i_2) \, d(t) \quad (B) \quad (4)$$

$$Q_{31} = -\frac{1}{\sqrt{3}} \int_{a_{c31} - \pi}^{a_{c31}} (v_{12} i_1 + v_{23} i_3) \, d(t) \quad (C)$$

where $a_{c12}$, $a_{c23}$, $a_{c31}$ are the earliest firing points for the thyristor switches controlling the reactive compensation in phase 12, phase 23 and phase 31, respectively.

In order to extend the integration to the actual firing points determined by delay angles $\alpha_{12}$, $\alpha_{23}$, and $\alpha_{31}$, without changing the half period ($\pi$) integration interval, Equations (4) are modified in the following way.

$$Q_{12} = -\frac{1}{\sqrt{3} \pi} \Bigg[ \int_{\alpha_{c12} - \pi}^{\alpha_{c12}} (v_{23} i_2 + v_{31} i_1) \, d(\omega t) \quad (A)$$

$$+ \int_{\alpha_{c12}}^{\alpha_{12}} (v_{23} i_2 + v_{31} i_1) \, d(\omega t) \quad (B)$$

$$- \int_{\alpha_{c12} - \pi}^{\alpha_{12} - \pi} (v_{23} i_2 + v_{31} i_1) \, d(\omega t) \Bigg] \quad (C)$$

$$Q_{23} = -\frac{1}{\sqrt{3} \pi} \Bigg[ \int_{\alpha_{c23} - \pi}^{\alpha_{c23}} (v_{31} i_3 + v_{12} i_2) \, d(\omega t) \quad (A)$$

$$+ \int_{\alpha_{c23}}^{\alpha_{23}} (v_{31} i_3 + v_{12} i_2) \, d(\omega t) \quad (B) \quad (5)$$

$$- \int_{\alpha_{c23} - \pi}^{\alpha_{23} - \pi} (v_{31} i_3 + v_{12} i_2) \, d(\omega t) \Bigg] \quad (C)$$

$$Q_{31} = -\frac{1}{\sqrt{3} \pi} \Bigg[ \int_{\alpha_{c31} - \pi}^{\alpha_{c31}} (v_{12} i_1 + v_{23} i_3) \, d(\omega t) \quad (A)$$

$$+ \int_{\alpha_{c31}}^{\alpha_{31}} (v_{12} i_1 + v_{23} i_3) \, d(\omega t) \quad (B)$$

$$- \int_{\alpha_{c31} - \pi}^{\alpha_{31} - \pi} (v_{12} i_1 + v_{23} i_3) \, d(\omega t) \quad (C)$$

Figure 3:
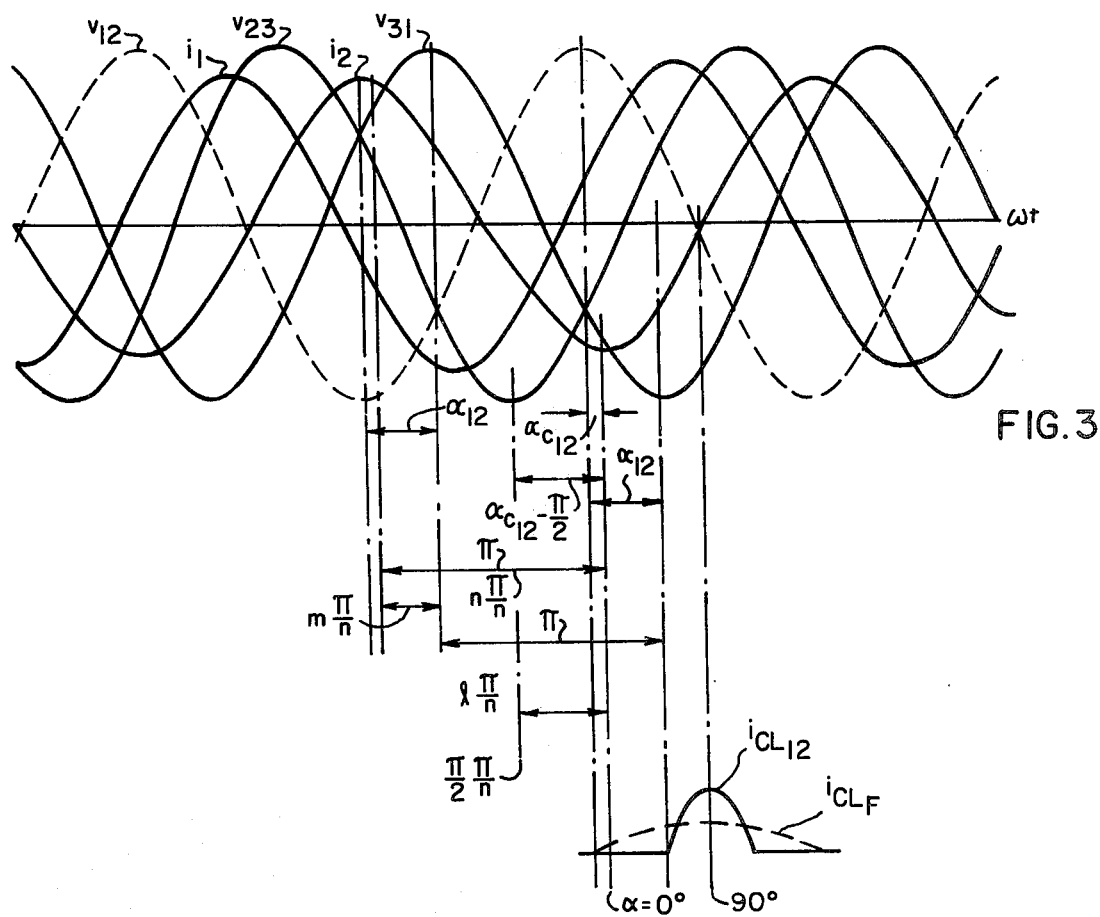
FIG. 3 shows a plot of appropriate phase voltages and currents with superimposed delineated calculation intervals and the appropriate firing angle and inductor current for the compensator.

Referring now to FIG. 3, the quantities defining the integration intervals for the computation of $Q_{12}$ are illustrated. Comparison of Equations (5) with Equations (4) shows that, for example, the integration interval defined by angles $\alpha_{c12} - \pi$ and $\alpha_{c12}$ [Equations (4)] is replaced by that defined by angles $a_{12} - \pi$ and $\alpha_{12}$. The new integration interval just precedes the firing point defined by $\alpha_{12}$. The "shift" of the integration interval is achieved by continuing the integration over the interval, for example, ($\alpha_{c12}$, $\alpha_{12}$) [that is, adding integrals (B) to the originally obtained (A)] and, at the same time, negating the integration in the interval ($\alpha_{c12} - \pi$, $\alpha_{12} - \pi$) [that is, subtracting integrals (C) from (A)]. The interval defined by, for example, angles $\alpha_{c12}$ and $\alpha_{12}$ extending from the earliest possible to the actual firing point, contains the most recent load information, and conversely, the interval defined by $\alpha_{c12} - \pi$ and $\alpha_{12} - \pi$ contains the oldest information. Thus, this manipulation makes it possible to replace the oldest with the most recent information about the load. Since the evaluation of the reactive powers ($Q_{12}$, $Q_{23}$ and $Q_{31}$) required for compensation determines the firing angles, it is not possible to decide in advance where the integration should start. The fundamental idea in the technique proposed, as shown by Equations (5), is to start the integration half a period prior to the earliest firing point. If the thyristor switch need not be fired at the earliest firing point (because the compensation requires smaller than the maximum current in the thyristor controlled inductor), the integration is continued until the actual firing point is found. Of course, the continued integration would change the length of the integration interval specified [Equations (1)], resulting in erroneous compensation. To keep the integration interval fixed, it is therefore necessary to negate a portion of the integration at the beginning of the integration interval. To accomplish this, it is necessary to store continuously (or in increments) the results of integration, beginning at the starting point (e.g., $\alpha_{c12}-\pi$) until the maximum possible "shift" of a quarter period (e.g. $\alpha_{c12}-\pi/2$), and to subtract the stored quantity appropriate for the extension of the integration at the other end as specified in Equations (5).

In order to describe the above control principles in digital terms, it is useful to rewrite Equations (5) in a form in which the integrations are approximated as sums of finite terms. This means, for example, that the integration interval, $\pi$, is divided into n subintervals; during a subinterval, the integration is approximated by multiplying the value of the integrand (taken at a point of the subinterval) with the subinterval; finally, all n products are summed. For example, if the interval $(\alpha_{c12}-\pi, \alpha_{c12})$ is divided into n subintervals by the points $$\alpha_{c12}-\pi \ \omega t_0-\pi < \omega t_1-\pi < \ldots$$
$$< \omega t_{(k-1)}-\pi < \omega t_k-\pi < \ldots \omega t_n-\pi = \alpha_{c12}$$

and we find the corresponding value of function $v_{23}(\xi_{12k})i_2(\xi_{12k})$ for any $(\omega t-\pi)=\xi_{12k}$ in the interval $(\omega t_{k-1}-\pi, \omega t_k-\pi)$, then the expression $$\frac{1}{\pi} \int_{\alpha_{c12}-\pi}^{\alpha_{c12}} v_{23} \, i_2 \, d(\omega t)$$

in Equations (5) may be approximated by $$\frac{1}{\pi} \sum_{k=1}^{n} v_{23}(\xi_{12k}) \, i_2(\xi_{12k}) \, (\omega t_k - \omega t_{(k-1)}).$$

If the n subintervals are of equal length, that is, $$\omega t_k - \omega t_{(k-1)} = \omega t_{(k=1)} - \omega t_k = \ldots = (\pi/n)$$

then, $$\frac{1}{\pi} \int_{\alpha_{c12}-\pi}^{\alpha_{c12}} v_{23} \, i_2 \, d(\omega t) \cong \frac{1}{n} \sum_{k=1}^{n} v_{23}(\xi_{12k}) \, i_2(\xi_{12k})$$

$$\left.\begin{array}{l}
Q_{12} \cong -\frac{1}{\sqrt{3}\,n} \left\{ \begin{array}{l} \sum_{k=1}^{n} [v_{23}(\xi_{12k}) i_2(\xi_{12k}) + v_{31}(\xi_{12k}) i_1(\xi_{12k})] \quad (A) \\[4pt] + \sum_{k=n}^{n+m} [v_{23}(\xi_{12k}) i_2(\xi_{12k}) + v_{31}(\xi_{12k}) i_1(\xi_{12k})] \quad (B) \\[4pt] - \sum_{k=1}^{m} [v_{23}(\xi_{12k}) i_2(\xi_{12k}) + v_{31}(\xi_{12k}) i_1(\xi_{12k})] \end{array}\right\} \quad (C) \\[16pt]
Q_{23} \cong -\frac{1}{\sqrt{3}\,n} \left\{ \begin{array}{l} \sum_{k=1}^{n} [v_{31}(\xi_{23k}) i_3(\xi_{23k}) + v_{12}(\xi_{23k}) i_2(\xi_{23k})] \quad (A) \\[4pt] + \sum_{k=n}^{n+m} [v_{31}(\xi_{23k}) i_3(\xi_{23k}) + v_{12}(\xi_{23k}) i_2(\xi_{23k})] \quad (B) \\[4pt] - \sum_{k=1}^{m} [v_{31}(\xi_{23k}) i_3(\xi_{23k}) + v_{12}(\xi_{23k}) i_2(\xi_{23k})] \end{array}\right\} \quad (C) \\[16pt]
Q_{31} \cong \frac{1}{\sqrt{3}\,n} \left\{ \begin{array}{l} \sum_{k=1}^{n} [v_{12}(\xi_{31k}) i_1(\xi_{31k}) + v_{23}(\xi_{31k}) i_3(\xi_{31k})] \quad (A) \\[4pt] + \sum_{k=n}^{n+m} [v_{12}(\xi_{31k}) i_1(\xi_{31k}) + v_{23}(\xi_{31k}) i_3(\xi_{31k})] \quad (B) \\[4pt] - \sum_{k=1}^{m} [v_{12}(\xi_{31k}) i_1(\xi_{31k}) + v_{23}(\xi_{31k}) i_3(\xi_{31k})] \end{array}\right\} \quad (C)
\end{array}\right\} \quad (6)$$

$$\left.\begin{array}{l}
Q_{12} \cong -K \left[ \sum_{k=1}^{n} (q_{12ak} + q_{12bk}) \quad (A) \right.\\[4pt]
\quad\quad + \sum_{k=n}^{n+m} (q_{12ak} + q_{12bk}) \quad (B) \\[4pt]
\quad\quad - \sum_{k=1}^{m} (q_{12ak} + q_{12bk})] \quad (C) \\[10pt]
Q_{23} \cong -K \left[ \sum_{k=1}^{m} (q_{23ak} + q_{23bk}) \quad (A) \right.\\[4pt]
\quad\quad + \sum_{k=n}^{n+m} (q_{23ak} + q_{23bk}) \quad (B) \\[4pt]
\quad\quad - \sum_{k=1}^{m} (q_{23ak} + q_{23bk})] \quad (C) \\[10pt]
Q_{31} \cong -K \left[ \sum_{k=1}^{m} (q_{31ak} + q_{31bk}) \quad (A) \right.\\[4pt]
\quad\quad + \sum_{k=n}^{n+m} (q_{31ak} + q_{31bk}) \quad (B) \\[4pt]
\quad\quad - \sum_{k=1}^{m} (q_{31ak} + q_{31bk})] \quad (C)
\end{array}\right\} \quad (7)$$

where $q_{12a}$, $q_{12b}$, $q_{23a}$, $q_{23b}$, and $q_{31a}$, $q_{31b}$ are the instantaneous values of the corresponding voltage and current products appearing in the respective compensating reactive power requirements $Q_{12}$, $Q_{23}$ and $Q_{31}$, and K is a constant scale factor:

$$K = \frac{1}{\sqrt{3}\,n}$$

By combining the terms $q_a$ and $q_b$ into one single term $q=q_a+q_b$ Equation (7) is further simplified as shown below:

$$Q_{12} \cong -K[\sum_{k=1}^{n} q_{12k} \quad (A)$$
$$+ \sum_{k=n}^{n+m} q_{12k} \quad (B)$$
$$- \sum_{k=1}^{m} g_{12k}] \quad (C)$$

$$Q_{23} \cong -K[\sum_{k=1}^{n} q_{23k} \quad (A)$$
$$+ \sum_{k=n}^{n+m} q_{23k} \quad (B)$$
$$- \sum_{k=1}^{m} q_{23k}] \quad (C)$$

$$Q_{31} = -K[\sum_{k=n}^{n} q_{31k} \quad (A)$$
$$+ \sum_{k=n}^{n+m} q_{31k} \quad (B)$$
$$- \sum_{k=1}^{m} q_{31k}] \quad (C)$$

(8)

On the basis of Equations (6), the mechanism of the control proposed can be described in more specific terms for one of the three phases, for example phase 12, as illustrated in FIG. 3.

1. The interval $(\alpha_{c12}-\pi, \alpha_{c12})$, with a length of $\pi$, is subdivided into n equal subintervals $\pi/n$.

2. The computation begins at a time corresponding to angle $\alpha_{c12}-\pi$, i.e., half a period prior to the earliest firing point, $\alpha_{c12}$.

3. The products $v_{23} i_2$ and $v_{31} i_1$ are sampled (measured) in or, for convenience, at the end of the first subinterval and are added to give the value $$q_{121}=v_{23}(\xi_{121})i_2(\xi_{121})=v_{31}(\xi_{121})i_1(\xi_{121}).$$

The quantity $q_{121}$ is stored.

4. The products $v_{23} i_2$ and $v_{31} i_1$ are sampled at the end of the second subinterval and are added to give the value:

$$q_{122}=V_{23}(\xi_{122})i_2(\xi_{122})=v_{31}(\xi_{122})i_1(\xi_{122}).$$

$q_{122}$ is stored. $q_{121}$ and $q_{122}$ are summed to give $q_{12S2}=q_{121}+q_{122}$.

5. The products $v_{23} i_2$ and $v_{31} i_1$ are sampled at the end of the third subinterval and are added to provide $q_{123}$.

$$q_{123}=v_{23}(\xi_{123})i_2(\xi_{123})+v_{31}(\xi_{123})i_1(\xi_{123})$$

$q_{123}$ is stored. $q_{123}$ is added to $q_{12S2}$ to provide:

$$q_{12S3} = q_{12S2} + q_{123} = q_{121} + q_{122} + q_{123} = \sum_{k=1}^{3} q_{12k}$$

6. The above process is repeated for every successive subinterval up to subinterval n/2, at which the previous operations are again performed:

$$q_{12n/2}=v_{23}(\xi_{12n/2})i_2(\xi_{12n/2})+V_{31}(\xi_{12n/2})i_1(\xi_{12n/2}).$$

$q_{12n/2}$ is stored. $q_{12n/2}$ is then summed to $q_{12S(n/2-1)}$ to provide $$q_{12S(n/2)} = q_{12S(n/2-1)} + q_{12n/2} = \sum_{k=1}^{n/2} q_{12k}.$$

7. In the subintervals following $\alpha_{12n/2}$, it is no longer necessary to store the instantaneous value of $q_{12k}$ (since the possible shift of the integration interval cannot be more than a quarter period, $\pi/2$, which corresponds to n/2 subintervals). Thus the operations performed, in, for example the n/2+1<n subinterval are as follows:

$$q_{12(n/2+l)}=v_{23}(\xi_{12(n/2+l)})i_2(\xi_{12(n/2+l)})+v_{31}(\xi_{12(n/2+l)})i_1(\xi_{12(n/2+l)}) \cdot q_{12(n/2+l)}$$

is summed to $$q_{12S(n/2+l-1)}$$

to provide $$q_{12S(s/2+l)} = q_{12S(n/2+l-1)} + q_{12(n/2+l)} = \sum_{k=1}^{n/2+l} q_{12k}$$

[Here l is the number of subintervals being evaluated in the interval $(\alpha_c-\pi/2, \alpha_c)$].

8. At $\xi_{12n}=\alpha_{c12}$ (i.e., at the earliest firing point) the operation, per Equations (6), is performed $$Q_{12}(\alpha_{c12}) = \frac{1}{\sqrt{3}} q_{12Sn} \quad (9)$$

[$Q_{12}(\alpha_{c12})$ represents the compensation required in phase 12, calculated in the half period interval just preceding $\alpha_{c12}$]. From $Q_{12}(\alpha_{c12})$, the required inductor current $$I_L(\alpha_{c12}) = I_{cc} - \frac{Q_{12}(\alpha_{c12})}{V_{12}} \quad (10)$$

and, subsequently, the corresponding firing angle $\alpha_{12}$ is computed;

$$I_L(\alpha_{c12}) = \frac{\sqrt{3} V_{12}}{\omega L} \frac{2}{\pi} [\frac{\pi}{2} - \alpha_{12} - \frac{1}{2} \sin 2\alpha_{12}] \quad (11)$$

where $I_{cc}$ is the amplitude of the fixed capacitor current and $V_{12}$ is the amplitude of the line-to-line voltage $v_{12}$.

9. If $\alpha_{12}$ computed $>\alpha_{c12}+\pi/n$, that is, firing is not needed at $\alpha_{c12}$, or in the interval $(\alpha_{c12}, \alpha_{c12}+\pi/2)$, the computation is continued in the first $\pi/2$ subinterval following $\xi_{12n}=\alpha_{c12}$ point in accordance with Equations (6) i.e., a. The products $v_{23} i_2$ and $v_{31} i_1$ are sampled at the end of the n+1 subinterval (i.e., at $\omega t=\alpha_{c12}+\pi/n$) and $q_{12(n+1)}$ is computed:

$$q_{12(n+1)}=v_{23}(\xi_{12(n+1)})i_2(\xi_{12(n+1)})+v_{31}(\xi_{12(n+1)})i_1(\xi_{12(n+1)}).$$

b. $q_{12(n+1)}$ is added to $q_{12Sn}$ to provide $$q_{12S(n+1)} = q_{12Sn} + q_{12(n+1)} = \sum_{k=1}^{n+1} q_{12k}$$

c. $q_{121}$ (i.e., $q_{12}$ obtained and stored at the end of the first subinterval) is subtracted from $q_{12S(n+1)}$ and the difference is multiplied by $-1/\sqrt{3}n$ to provide the reactive power compensation required.

$$Q_{12}\left(\alpha_{c12} + \frac{\pi}{n}\right) = -\frac{1}{\sqrt{3}\,n}(q_{12S(n+1)} - q_{121}) \quad (12)$$

d. From the reactive power $Q_{12}(\alpha_{c12}+\pi/n)$, the corresponding inductor current $$I_{L12}\left(\alpha_{c12} + \frac{\pi}{n}\right) = I_{cc} - \frac{Q_{12}\left(\alpha_{c12} + \frac{\pi}{n}\right)}{V_{12}} \quad (13)$$

and, subsequently, the corresponding firing angle is determined;

$$I_L\left(\alpha_{c12} + \frac{\pi}{n}\right) = \frac{\sqrt{3}\,V_{12}}{\omega L}\,\frac{2}{\pi}\left[\frac{\pi}{n} - \alpha_{12} - \frac{1}{2}\sin 2\alpha_{12}\right] \quad (14)$$

10. If $\alpha_{12} > \alpha_{c12} + 2\pi/n$, that is, firing is not needed at $\alpha_{c12}+\pi/n$, or in the interval $(\alpha_{c12}+\pi/n, \alpha_{c12}+2\pi/n)$, the above computation is repeated in the next $(\pi/n)$ subinterval, i.e., in the interval $(\alpha_{c12}+/n, \alpha_{c12}+2\pi/n)$, and so on. Assuming that the condition for firing is satisfied at the mth subinterval after $\alpha_c$, i.e., $\alpha_{12} < \alpha_{c12}+(m+1)\pi/n$, the computation in the last subinterval is analogous to those shown under #9. That is:

a. The products $v_{23}\,i_2$ and $v_{31}\,i_1$ are sampled at the end of the $n+m$ subinterval and $q_{12(n+m)}$ is computed:

$$q_{12(n+m)} = v_{23}(\xi_{12(n+m)})i_2(\xi_{12(n+m)}) + v_{31}(\xi_{12(n+m)})i_1(\xi_{12(n+m)})$$

b. $q_{12(n+m)}$ is added to $q_{12S(n+m-1)}$ to provide $$q_{12S(n+m)} = q_{12S(n+m-1)} + q_{12(n+m)} = \sum_{k=1}^{n+m} q_{12k}$$

c. The sum $$\sum_{k=1}^{m}$$

is produced [recall that each $q_{12k}$ ($k=1,2\ldots m = \leq n/2$) has been stored] and subtracted from $q_{12S(n+m)}$; the difference is multiplied by $-1/\sqrt{3}n$ to obtain the reactive power compensation $Q_{12}(\alpha_{c12}+m\pi/2)$ required;

$$Q_{12}\left(\alpha_{c12} + m\frac{\pi}{n}\right) = -\frac{1}{\sqrt{3}\,n}\left(q_{12S(n+m)} - \sum_{k=1}^{m} q_{12k}\right)$$
$$= -\frac{1}{\sqrt{3}\,n}\sum_{k=1}^{n+m}(q_{12k} - \Sigma q_{12k}) \quad (15)$$

d. From $Q_{12}(\alpha_{c12}+m\pi/n)$, the corresponding inductor current $$I_L\left(\alpha_{12} + m\frac{\pi}{n}\right) = I_{cc} - \frac{Q_{12}\left(\alpha_{c12} + m\frac{\pi}{n}\right)}{V_{12}} \quad (16)$$

and, subsequently, the corresponding firing angle is determined $$I_L\left(\alpha_{c12} + m\frac{\pi}{n}\right) = \frac{\sqrt{3}\,V_{12}}{\omega L}\,\frac{2}{\pi}\left[\frac{\pi}{2} - \alpha_{12} - \frac{1}{2}\sin 2\alpha_{12}\right]. \quad (17)$$

10. At the firing angle $\alpha_{12}$, which is in the interval $(\alpha_{c12}+\pi/n, \alpha_{c12}+(m+1)\pi/n)$, the thyristor switch in phase 12 is fired.

As is evident from the above description, the procedure described does, in effect shift the original integration interval $(\alpha_{c12}-\pi, \alpha_{c12})$ to coincide with the half period interval $(\alpha_{12}-\pi, \alpha_{12})$ just prior to the actual firing. It is also clear that by making n appropriately large, and thereby the subinterval $\pi/n$ short, the approximations indicated in Equations (6) can approach the exact expressions give in (5) as closely as desired.

The control principles with the computation procedure described may be implemented by either analog or digital circuits.

Referring once again to FIG. 4, an example of a shifting firing angle computer implemented with analogue type circuit elements (for calculating $\alpha_{12}$) is shown. This block diagram contains four-quadrant Analog Multipliers X1, X2; Adder/Subtractors S1, S2, S3; Amplifiers K, $1/V_{12}$; a Resettable Integrator I; a Sample and Hold functional circuit (S/H); an Analog Delay Line (ADL) consisting of n series sample and holds and a common clock, sometimes called a "bucket brigade" in the literature; a Phase Locked Loop device (PLL) which providing real time digital signals in prescribed phase relationship to its input signal (here $v_{12}$); a Function Generator (FG) which provides a firing angle-inductor current relationship; and a Comparator (COMP) which provides a firing pulse output at $\alpha_{12}$. Two monostable circuits MS1, MS2 are also employed.

In the implementation of the analog shifting firing angle computer, it is assumed that the required voltage and current signals are appropriately obtained by the voltage calculators $V_{12}C$, $V_{23}C$ and $V_{31}C$ for example. In accordance with Equations (5) or its simplified form, Equation (8), the instantaneous values of the voltage and current products $q_{12a}$ and $q_{12b}$ appear at the outputs of X1 and X2 respectively. The products are summed by summing device S1 resulting in $q_{12}$. The quantity $q_{12}$ is scaled by passing it through device K after which the signal K $q_{12}$ is obtained. The same K $q_{12}$ signal must then be integrated with three different boundaries according to integrals A, B, and C, defined in Equations (5) or (8). Fortunately, these boundaries are such that all three integrals can be derived from the single analog integrator I. The initiation of I is accomplished by resetting the integrator at each $\alpha_{c12}$ to zero. Since $\alpha_{c12}$ is constant and locked to the power line frequency, the phase locked loop PLL can trigger MS1 which in turn triggers MS2 thus providing two short pulses. The second pulse starts when the first pulse is terminated. The second pulse is used for resetting I, the first pulse controls the Sample and Hold S/H which samples and stores the final value of I just before it is reset. This is repeated in every half cycle of the line voltage. The resettable Integrator I output is connected to the input of the analog delay line ADL which is also controlled by clock pulses from PLL to provide a half cycle delay for the Integrator I output signal ($f_{v12} = 60$ Hz in FIG. 4). There is at this point a stored, a delayed, and of course, an instantaneous output of Resettable Integrator I.

The stored output represents the complete half cycle integral of K $q_{12}$ between $\alpha_{c12}-\pi$ and $\alpha_{c12}$ of consecutive half cycles, therefore, the S/H output is equal to expression (A) in Equations (4) or (8).

The delayed output repesents the integral of K $q_{12}$ as it occurred 180° earlier. Therefore, according to Equations (5) or (8), this signal is equal to the quantity given in (C).

The instantaneous output of I represents (B), because as has been stated stated earlier, I is reset at each $\alpha_{c12}$ instant, which is the lower limit for the integral given in (B). The two real time signals (B) and (C), and the stored signal (A) are summed by summer S2 according to their signs in the equations. From S2, we obtain the reactive power required for compensation.

The reactive power $Q_{12}(\alpha_{c12}+m\pi/n)$ is converted to inductor current $I_L$ by the constant scale (gain) factor $1/V_{12}$ and then subtracted from $I_{cc}$ according to Equations (16) by S3. The effect of voltage amplitude variation is taken care of by the Function Generator (FG). The Function Generator (FG) and Comparator (COMP) with firing angle $\alpha_{12}$ output are redrawn for completeness of the block diagram and easier comparison with prior art techniques.

It will be noted with respect to the embodiment of the invention shown in FIG. 4 that the schematic block diagram of the $\alpha_{12}$ calculator is shown in detail.

For purposes of simplicity of illustration, the $\alpha_{23}$ calculator and the $\alpha_{31}$ calculator are shown only as separate functional blocks, it being realized that the internal construction of the various control elements are essentially the same as those shown in the $\alpha_{12}$ calculator.

It is to be understood with respect to the embodiments of this invention that the load which is schematically shown as an arc furnace in FIG. 4 is not limited thereto. In fact, the regulating circuit and control apparatus shown in FIG. 4 may be utilized for compensating for the reactive load effects of any kind of load which has a wildly-varying reactive component. It is also to be understood that compensation for both negative and positive cycles of current and voltage may be accomplished. It is also to be understood that the techniques for obtaining the load currents $i_1$, $i_2$, and $i_3$ may include conventional current monitoring techniques such as those which utilize current transformers and the like. It is to be understood that the utilization of a fixed delay angle $\alpha_{c12}$ is not necessary for the proper operation of this circuit and the utilization thereof is merely illustrated in FIG. 3, for example, to give a clear indication of the advanced apparatus which is provided by this invention. In a trivial but nevertheless sometimes desirable situation, the fixed delay angle $\alpha_{c12}$ may be considered to be 0°.

The apparatus described with respect to the embodiments of this invention have many advantages. One advantage lies in the fact that the source currents $I_{S1}$, $I_{S2}$, $I_{S3}$ as shown in FIG. 4 may appear to be in-phase with the source voltages $v_{t1}$, $v_{t2}$, and $v_{t3}$ even though the load currents $i_1$, $i_2$, and $i_3$ vary wildly due to the effects of the load. Another advantage lies in the fact that in a three-phase AC system such as is shown in FIG. 4, the source currents $I_{S1}$, $I_{S2}$, and $I_{S3}$ may be balanced by the compensator 10 even though the load currents $i_1$, $i_2$, and $i_3$ are not balanced. Another advantage lies in the fact that the extension of the computation interval into the half cycle in which compensation is to be made by an amount as large as the angle $\alpha_{12}$ allows for the utilization of the most recent data to determine the value of the angle $\alpha_{12}$. This has the tendency to improve the reliability, accuracy, and speed of the control system in terms of determining the proper amount of compensating current for providing balanced and near unity phase relationships for the source currents $I_{S1}$, $I_{S2}$, and $I_{S3}$ in relationship to the terminal or source voltages.

We claim:

1. Apparatus connected to an A.C. electrical system for providing predetermined reactive power to between two conductors of the system regardless of the power factor of the load supplied by the two conductors, comprising:

switched compensator means connected between said two conductors for supplying an appropriate value of compensating current to said conductors during a portion of a cycle of the supply voltage across the conductors as a function of a switch firing angle ($\alpha$);

power determining means interconnected with said electrical system for determining power values in said electrical system;

integrator means interconnected with said power determining means for integrating said power values with time to provide a running accumulated power integration value as an output, said integration beginning at a starting point in time which precedes by a given number of degrees the earliest predetermined firing point in said portion of said supply voltage cycle for said compensator means, said integration continuing for said given number of degrees to thus provide an initial accumulated power integration value at the end of said given number of degrees;

storage means interconnected with said integrator means for storing successive incremental values of said accumulated power integration value, each increment of storage being N degrees in duration with the first increment beginning at said starting point;

compensating current determining means interconnected with said integrator means for determining a value of compensating current for said portion of said cycle as a function of said initial accumulated power integration value; and firing angle determining means interconnected with said compensating current determining means, said storage means, and said switched compensator means for converting said value of compensating current to a firing angle trigger signal, said firing angle trigger signal only being applied to said switched compensator means to thus supply said compensating current if said calculated firing angle ($\alpha$) is less than or equal to an N degree interval beyond said earliest predetermined firing point, otherwise said firing angle determining means actuating said compensating current determining means to update the value of said compensating current by allowing said integrator means to continue to integrate said power values beyond said earliest predetermined firing point to the end of said later N degree interval and by subtracting that incremental value of said accumulated power integration value which had been stored said given number of degrees earlier to thus provide a new total accumulated power integration value for being utilized to determine a new calculated firing angle ($\alpha$), said updating process continuing in intervals of N degrees until said new calculated firing angle ($\alpha$) is determined to be in the next N degree interval, during which interval said compensating current will be applied to said conductors.

2. The combination as claimed in claim 1 wherein said given number of degrees equals 180 degrees.

3. The combination as claimed in claim 1 wherein said portion of said supply voltage cycle equals one-half cycle thereof.

4. Apparatus connected to an A.C. electrical system for providing predetermined reactive power two conductors of the system regardless of the power factor of the load supplied by the two conductors, comprising:

switched compensator means connected between said two conductors for supplying an appropriate value of compensating current to said conductors during a portion of a cycle of 60 hz supply voltage across the conductors as a function of a switch firing angle ($\alpha$);

power determining means interconnected with said electrical system for determining power values in said electrical system;

integrator means interconnected with said power determining means for integrating said power values with time to provide a running accumulated power integration value as an output, said integration beginning at a starting point in time which precedes by a given number of degrees the earliest predetermined firing point in said portion of said supply voltage cycle for said compensator means, said integration continuing for said given number of degrees to thus provide an initial accumulated power integration value at the end of said given number of degrees;

storage means interconnected with said integrator means for storing successive incremental values of said accumulated power integration value, each increment of storage being N degrees in duration with the first increment beginning at said starting point;

compensating current determining means interconnected with said integrator means for determining a value of compensating current for said portion of said cycle as a function of said initial accumulated power integration value; and firing angle determining means interconnected with said compensating current determining means, said storage means, and said switched compensator means for converting said value of compensating current to a firing angle trigger signal, said firing angle trigger signal only being applied to said switched compensator means to thus supply said compensating current if said calculated firing angle ($\alpha$) is less than or equal to an N degree interval beyond said earliest predetermined firing point, otherwise said firing angle determining means actuating said compensating current determining means to update the value of said compensating current by allowing said integrator means to continue to integrate said power values beyond said earliest predetermined firing point to the end of said later N degree interval and by subtracting that incremental value of said accumulated power integration value which had been stored said given number of degrees earlier to thus provide a new total accumulated power integration value for being utilized to determine a new calculated firing angle ($\alpha$), said updating process continuing in intervals of N degrees until said new calculated firing angle ($\alpha$) is determined to be in the next N degree interval, during which interval said compensating current will be applied to said conductors.

5. The combination as claimed in claim 4 wherein said given number of degrees equals 180 degrees.

6. The combination as claimed in claim 4 wherein said portion of said supply voltage cycle equals one half cycle thereof.

7. The combination as claimed in claim 5 wherein said portion of said supply voltage cycle equals one half cycle thereof and where said earliest predetermined firing point corresponds to the time of the occurrence of the maximum absolute value of said supply voltage during each one half cycle thereof.

8. The combination as claimed in claim 5 wherein said portion of said supply voltage cycle equals one half cycle thereof and where said earliest predetermined firing point corresponds to a fixed time after the time of the occurrence of the maximum absolute value of said supply voltage during each one half cycle thereof.

9. Apparatus connected to an A.C. electrical system for providing substantially unity power factor between the 60 hz supply voltage across two conductors of the system and the 60 hz supply current regardless of the power factor of the load supplied by the two conductors, comprising:

switched compensator means connected between said two conductors for supplying an appropriate value of compensating current to said conductors during a portion of a cycle of said supply voltage as a function of a switch firing angle ($\alpha$);

power determining means interconnected with said electrical system for determining power values in said electrical system;

integrator means interconnected with said power determining means for integrating said power values with time to provide a running accumulated power integration value as an output, said integration beginning at a starting point in time which precedes by a given number of degrees the earliest predetermined firing point in said portion of said supply voltage cycle for said compensator means, said integration continuing for said given number of degrees to thus provide an initial accumulated power integration value at the end of said given number of degrees;

storage means interconnected with said integrator means for storing successive incremental values of said accumulated power integration value, each increment of storage being N degrees in duration with the first increment beginning at said starting point;

compensating current determining means interconnected with said integrator means for determining a value of compensating current for said portion of said cycle as a function of said initial accumulated power integration value; and firing angle determining means interconnected with said compensating current determining means, said storage means, and said switched compensator means for converting said value of compensating current to a firing angle trigger signal, said firing angle trigger signal only being applied to said switched compensator means to thus supply said compensating current if said calculated firing angle ($\alpha$) is less than or equal to an N degree interval beyond said earliest predetermined firing point, otherwise said firing angle determining means actuating said compensating current determining means to update the value of said compensating current by allowing said integrator means to continue to integrate said power values beyond said earliest predetermined firing point to the end of said later N degree interval and by subtracting that incremental value of said accumulated power integration value which had been stored said given number of degrees earlier to thus provide a new total accumulated power integration value for being utilized to determine a new calculated firing angle (α), said updating process continuing in intervals of N degrees until said new calculated firing angle (α) is determined to be in the next N degree interval, during which interval said compensating current will be applied to said conductors.

10. The combination as claimed in claim 9 wherein said given number of degrees equals 180 degrees.

11. The combination as claimed in claim 9 wherein said portion of said supply voltage cycle equals one half cycle thereof.

12. The combination as claimed in claim 10 wherein said portion of said supply voltage cycle equals one half cycle thereof and where said earliest predetermined firing point corresponds to the time of the occurrence of the maximum absolute value of said supply voltage during each one half cycle thereof.

13. The combination as claimed in claim 10 wherein said portion of said supply voltage cycle equals one half cycle thereof and where said earliest predetermined firing point corresponds to a fixed time after the time of the occurrence of the maximum absolute value of said supply voltage during each one half cycle thereof.

14. Apparatus connected to a three phase A.C. electrical system for providing a predetermined power factor between the 60 hz supply voltage across two conductors of the system and the 60 hz supply current in those conductors regardless of the power factor of the load supplied by the two conductors, comprising:

switched compensator means connected between said two conductors for supplying an appropriate value of compensating current to said conductors during a portion of a cycle of said supply voltage as a function of a switch firing angle (α);

power determining means interconnected with said electrical system for determining power values in said electrical system;

integrator means interconnected with said power determining means for integrating said power values with time to provide a running accumulated power integration value as an output, said integration beginning at a starting point in time which precedes by a given number of degrees the earliest predetermined firing point in said portion of said supply voltage cycle for said compensator means, said integration continuing for said given number of degrees to thus provide an initial accumulated power integration value at the end of said given number of degrees;

storage means interconnected with said integrator means for storing successive incremental values of said accumulated power integration value, each increment of storage being N degrees in duration with the first increment beginning at said starting point;

compensating current determining means interconnected with said integrator means for determining a value of compensating current for said portion of said cycle as a function of said initial accumulated power integration value; and firing angle determining means interconnected with said compensating current determining means, said storage means, and said switched compensator means for converting said value of compensating current to a firing angle trigger signal, said firing angle trigger signal only being applied to said switched compensator means to thus supply said compensating current if said calculated firing angle (α) is less than or equal to an N degree interval beyond said earliest predetermined firing point, otherwise said firing angle determining means actuating said compensating current determining means to update the value of said compensating current by allowing said integrator means to continue to integrate said power values beyond said earliest predetermined firing point to the end of said later N degree interval and by subtracting that incremental value of said accumulated power integration value which had been stored said given number of degrees earlier to thus provide a new total accumulated power integration value for being utilized to determine a new calculated firing angle (α), said updating process continuing in intervals of N degrees until said new calculated firing angle (α) is determined to be in the next N degree interval, during which interval said compensating current will be applied to said conductors.

15. The combination as claimed in claim 14 wherein said given number of degrees equals 180 degrees.

16. The combination as claimed in claim 14 wherein said portion of said supply voltage cycle equals one half cycle thereof.

17. The combination as claimed in claim 15 wherein said portion of said supply voltage cycle equals one half cycle thereof and where said earliest predetermined firing point corresponds to the time of the occurrence of the maximum absolute value of said supply voltage during each one half cycle thereof.

18. The combination as claimed in claim 15 wherein said portion of said supply voltage cycle equals one half cycle thereof and where said earliest predetermined firing point corresponds to a fixed time after the time of the occurrence of the maximum absolute value of said supply voltage during each one half cycle thereof.

19. Apparatus connected to a three phase A.C. electrical system for providing substantially unity power factor between the 60 hz supply voltage across two conductors of the system and the 60 hz supply current in those conductors regardless of the power factor of the load supplied by the two conductors, and for balancing the supply current of the system regardless of the status of the load currents, comprising:

switched compensator means connected between said two conductors for supplying an appropriate value of compensating current to said conductors during a portion of a cycle of said supply voltage as a function of a switch firing angle (α);

power determining means interconnected with said electrical system for determining power values in said electrical system;

integrator means interconnected with said power determining means for integrating said power values with time to provide a running accumulated power integration value as an output, said integration beginning at a starting point in time which precedes by a given number of degrees the earliest predetermined firing point in said portion of said supply voltage cycle for said compensator means, said integration continuing for said given number of degrees to thus provide an initial accumulated power integration value at the end of said given number of degrees;

storage means interconnected with said integrator means for storing successive incremental values of said accumulated power integration value, each increment of storage being N degrees in duration with the first increment beginning at said starting point;

compensating current determining means interconnected with said integrator means for determining a value of compensating current for said portion of said cycle as a function of said initial accumulated power integration value; and firing angle determining means interconnected with said compensating current determining means, said storage means, and said switched compensator means for converting said value of compensating current to a firing angle trigger signal, said firing angle trigger signal only being applied to said switched compensator means to thus supply said compensating current if said calculated firing angle ($\alpha$) is less than or equal to an N degree interval beyond said earliest predetermined firing point, otherwise said firing angle determining means actuating said compensating current determining means to update the value of said compensating current by allowing said integrator means to continue to integrate said power values beyond said earliest predetermined firing point to the end of said later N degree interval and by substracting that incremental value of said accumulated power integration value which had been stored said given number of degrees earlier to thus provide a new total accumulated power integration value for being utilized to determine a new calculated firing angle ($\alpha$), said updating process continuing in intervals of N degrees until said new calculated firing angle ($\alpha$) is determined to be in the next N degree interval, during which interval said compensating current will be applied to said conductors.

20. The combination as claimed in claim 19 wherein said given number of degrees equals 180 degrees.

21. The combination as claimed in claim 19 wherein said portion of said supply voltage cycle equals one half cycle thereof.

22. The combination as claimed in claim 20 wherein said portion of said supply voltage cycle equals one half cycle thereof and where said earliest predetermined firing point corresponds to the time of the occurrence of the maximum absolute value of said supply voltage during each one half cycle thereof.

23. The combination as claimed in claim 20 wherein said portion of said supply voltage cycle equals one half cycle thereof and where said earliest predetermined firing point corresponds to a fixed time after the time of the occurrence of the maximum absolute value of said supply voltage during each one half cycle thereof.

24. A method for providing predetermined reactive power between two conductors of an A.C. electrical system regardless of the power factor of the load supplied by the two conductors, comprising the steps of:

(a) supplying an appropriate value of compensating current to said conductors during a portion of a cycle of the supply voltage across the conductors as a function of a switch firing angle ($\alpha$) for a switched compensator means connected between said two conductors;

(b) determining power values in said electrical system;

(c) integrating said power values with time to provide a running accumulated power integration value as an output, said integration beginning at a starting point in time which precedes by a given number of degrees the earliest predetermined firing point in said portion of said supply voltage cycle for said compensator means, said integration continuing for said given number of degrees to thus provide an initial accumulated power integration value at the end of said given number of degrees;

(d) storing successive incremental values of said accumulated power integration value, each increment of storage being N degrees in duration with the first increment beginning at said starting point;

(e) determining a value of compensating current for said portion of said cycle as a function of said initial accumulated power integration value; and (f) converting said value of compensating current to a firing angle trigger signal, said firing angle trigger signal only being applied to said switched compensator means to thus supply said compensating current if said calculated firing angle ($\alpha$) is less than or equal to an N degree interval beyond said earliest predetermined firing point, otherwise updating the value of said compensating current by allowing said integration to continue to integrate said power values beyond said earliest predetermined firing point to the end of said later N degree interval and by subtracting that incremental value of said accumulated power integration value which had been stored said given number of degrees earlier to thus provide a new total accumulated power integration value for being utilized to determine a new calculated firing angle ($\alpha$), said updating process continuing in intervals of N degrees until said new calculated firing angle ($\alpha$) is determined to be in the next N degree interval, during which interval said compensating current will be applied to said conductors.

* * * * *